United States Patent Office 3,147,288
Patented Sept. 1, 1964

3,147,288
DYEING COMPOSITION AND METHOD
Raymond Stanley Max Frohnsdorff, Twickenham, England, assignor to The Gillette Company, Boston, Mass., a corporation of Delaware
No Drawing. Filed Mar. 14, 1960, Ser. No. 14,517
Claims priority, application Great Britain Mar. 12, 1959
5 Claims. (Cl. 260—396)

This invention is for improvements in or relating to the dyeing of keratinous fibres and has for an object to facilitate the use of dyestuffs, particularly in connection with the dyeing of human hair, which dyestuffs ordinarily are of low solubility in water and are therefore difficult to apply with a view to obtaining any depth of tint.

An example of a dyestuff of low solubility in water is the essential ingredient of henna, namely lawsone whose systematic name is 2-hydroxy-1,4-naphthoquinone.

We have discovered that the solubility of this hydroxy-naphthoquinone in aqueous solution can be increased to provide solutions of an adequate concentration for the dyeing of keratinous fibres, particularly human hair, by introducing into the nucleus of the hydroxy-naphthoquinone, a solubilising radical or group which is attached to the nucleus via a sulphur atom.

There is provided by the present invention a dye for keratinous fibres which comprises a nuclear-substituted mono- or poly-hydroxy-naphthoquinone wherein the nuclear substituent is a thio-ether group which is itself substituted with a hydrophilic group, which nuclear substituent is attached to the nucleus by the sulphur atom of said thio-ether group.

According to the present invention, there is also provided a process for the preparation of a dye for keratinous fibres which comprises treating a mono- or poly-hydroxy-naphthoquinone with a solution of at least one molecular proportion of a thiol substituted with a hydrophilic group. Among the substituted thiols that may be employed in the present invention may be mentioned thioglycollic acid, thiolactic acid, α- and β-mercaptopropionic acids, mercapto-ethanesulphonic acid, water-soluble salts thereof, such as an ethanolamine salt and the ammonium, sodium, potassium, magnesium and calcium salt; α- and β-monothioglycerols and 1-thiosorbitol. The most convenient substituted thiols however, are thio-glycollic acid, or a water-soluble salt thereof, and the α- or β-mono-thio-glycerol.

Preferably not more than three molecular proportions of the thiol is employed and more preferably the thiol is used in the proportion of two mols thereof to each mol of the hydroxynaphthoquinone.

The invention is of particular interest in its application to 2-hydroxy-1,4-naphthoquinone which is the active ingredient in henna and is also applicable to 5-hydroxy-1,4-naphthoquinone, both of which compounds are mono-hydroxylated naphthoquinones; 5,8-dihydroxyl-1,4-naphthoquinone, which is a dihydroxynaphthoquinone, and 5,7,8-trihydroxy-1,4-naphthoquinone, which is a trihydroxy naphthoquinone, are other examples of hydroxy-naphthoquinones whose normal solubility in water is very low, but which, in the form of their reaction products with the said thiols, have their solubility characteristics modified in such a way as to allow of solutions of an acceptable concentration for use in the dyeing of human hair to be readily prepared.

The reaction between the hydroxy-naphthoquinones and the substituted thiols will proceed satisfactorily in aqueous, or aqueous ethanolic, solution at room, or slightly elevated, temperatures over varying periods of time ranging from half an hour to two days.

The invention therefore includes compositions for use in the dyeing of keratinous fibers, particularly human hair, comprising an aqueous, or aqueous-alcoholic solution of the dye provided by the present invention; the composition may also contain one or more detergents whereby the composition becomes a tinting shampoo, and in this case for the purposes of dyeing, the solution is conveniently adjusted to a pH of from 3 to 10 for example to a pH of from 7 to 8. The detergent should be unreactive towards the dye and its constituents and should, therefore, be chosen accordingly. Thus, when a thiol carboxylic or sulphonic acid is employed, the detergent should not be of the cationic type and conversely when a basic thiol is employed, the detergent should not be of the anionic type. Subject to this condition a wide variety of detergents may be employed including cationic, anionic and non-ionic surface active agents as well as mixtures thereof with each other. Among those which may be mentioned are the alkyl sulphates such as sodium lauryl sulphate and diethanolamine lauryl sulphate as well as mixtures of for example triethanolamine lauryl sulphate with coco-diethanolamide condensate, alkyl aryl sulphonates such as the triethanolamine salt of dodecyl benzene sulphonate, the sarcosides, the fatty acid imidazolines and non-ionic surface-active agents such as polyglycol ethers of alkyl phenols.

The detergent may be employed in the shampoo compositions in a wide range of proportions, usually from 10 to 40% by weight of active detergent based on the weight of the total shampoo composition and preferably from 10% to 30% by weight.

The invention further comprises a method of dyeing keratinous fibres, particularly human hair, which comprises applying thereto a composition for dyeing keratinous fibres provided by the present invention.

In one modification of this method, the thiol may be applied to the fibres prior to the application thereto of a suspension of the said hydroxy-naphthoquinone; alternatively the thiol may be applied after application of the suspension of the said hydroxy-naphthoquinone.

The following examples, in which the percentages quoted are calculated by weight, will serve to illustrate the manner in which the invention may be carried into effect.

Example 1

An aqueous suspension of 1.7 g. 5-hydroxy-1,4-naphthoquinone was prepared in 100 mls. water and this was added to 2.8 g. ammonium thioglycollate (55% thioglycollic acid). The solution was warmed thoroughly until the solid had dissolved and an intensely yellow-brown solution was obtained. Two tresses consisting of (a) equal amounts of brown and grey human hair and (b) yak hair respectively were impregnated with the solution and they were then left exposed to the atmosphere for half an hour to allow the colour to develop; finally the hair was rinsed and allowed to dry.

This treatment produced a strong yellow-brown colour on the hair tresses.

Example 2

5,8-dihydroxy-1,4-naphthoquinone was purified by sublimation and 1.9 g. of the purified substance treated with 2.8 g. ammonium thioglycollate (55% thioglycollic acid). The quinone dissolved rapidly and the mixture was diluted with water to 100 mls. to give an intensely coloured solution. Two tresses consisting of (a) equal amounts of brown and grey human hair and (b) yak hair respectively were impregnated with the solution and they were then left exposed to the atmosphere for half an hour to allow the colour to develop; finally the hair was rinsed and allowed to dry.

This treatment produced a strong blue-grey colour on the yak hair and a more natural brown colour on the gray hair which blended well with the brown fibres.

*Example 3*

1.7 g. 2-hydroxy-1,4-naphthoquinone was treated with 2.8 g. ammonium thioglycollate (55% thioglycollic acid). The quinone dissolved rapidly when the mixture was slightly warmed and the whole was diluted to 100 mls. to give a red-brown solution. Two tresses consisting of (a) equal amounts of brown and grey human hair and (b) yak hair respectively were impregnated with the solution and they were then left exposed to the atmosphere for half an hour to allow the colour to develop; finally the hair was rinsed and allowed to dry.

This treatment produced an intense orange colour on the hair.

*Example 4*

A suspension containing 1.7 g. 5-hydroxy-1,4-naphthoquinone was prepared in a 50/50 water/ethyl alcohol mixture. 4.9 g. thioglycerol (45%) was added and the solid quinone rapidly dissolved to give an intensely yellow-brown solution. Two tresses consisting of (a) equal amounts of brown and grey human hair and (b) yak hair respectively were impregnated with the solution and they were then left exposed to the atmosphere for half an hour to allow the colour to develop; finally the hair was rinsed and allowed to dry.

The treatment produced a yellow-brown colour on the hair.

*Example 5*

Two tresses consisting of (a) equal amounts of brown and grey human hair and (b) yak hair respectively were impregnated with a 0.6 N solution of ammonium thioglycollate which was also 0.6 N with respect to free ammonium hydroxide. The hair was exposed to the atmosphere for half an hour, rinsed with water and was then impregnated with a suspension containing 1.7 g. 5-hydroxy-1,4-naphthoquinone in a 50/50 water-ethyl alcohol mixture. The hair was then left exposed to the atmosphere for a further half an hour to allow the colour to develop and finally rinsed in water and allowed to dry.

This treatment produced an intense chestnut brown colour on the hair.

*Example 6*

A suspension containing 1.7 g. 5-hydroxy-1,4-naphthoquinone was prepared in a 50/50 water-ethyl alcohol mixture. Two tresses consisting of (a) equal amounts of brown and grey human hair and (b) yak hair respectively were impregnated with the solution and after 5 minutes a 0.6 N solution of ammonium thioglycollate which was also 0.6 N with respect to free ammonium hydroxide was applied with a cotton wool applicator. The tresses were then left exposed to the atmosphere for half an hour to allow the colour to develop, rinsed with water and allowed to dry.

This treatment produced a strong chestnut brown colour on the hair.

*Example 7*

5,8-dihydroxy-1,4-naphthoquinone was purified by sublimation and 1.5 g. of the purified substance was treated with 2.1 g. thioglycollic acid (75%). When the quinone had dissolved, 40 g. triethanolamine lauryl sulphate (40% active ingredient) and 2.5 g. lauric diethanolamide were added and the solution diluted to 100 mls. with water. Two tresses consisting of (a) equal amounts of brown and grey human hair and (b) yak hair respectively were shampooed, impregnated with the dye solution and left exposed to the atmosphere for half an hour to allow the colour to develop. A little water was then added and the tresses gently massaged to produce a lather before rinsing thoroughly with water and allowing to dry.

This treatment produced a strong purple-grey shade on the yak hair and the colour of the grey hair blended well with the natural brown fibres.

Generally the time required to allow the colour to develop after impregnating the tresses as above described, will not be less than 5 minutes or more than 1 hour. The time interval, however, between application of the separate dye constituents may be any convenient period.

I claim:

1. A dye for keratinous fibres which consists essentially of a thioether prepared by reacting in an aqueous medium one molecular proportion of a quinone selected from the class consisting of 2-hydroxy-1,4-naphthoquinone, 5-hydroxy-1,4-naphthoquinone, 5,8-dihydroxy-1,4-naphthoquinone, and 5,7,8-trihydroxy-1,4-naphthoquinone with from one to three molecular proportions of a thiol selected from the class consisting of thioglycollic acid, thiolactic acid, alpha- and beta-mercaptopropionic acid, mercaptoethane-sulphonic acid, water-soluble salts of said acids, alpha- and beta-thioglycerol, and 1-thiosorbitol.

2. A dye as claimed in claim 1 in which said thiol is thioglycollic acid.

3. A dye as claimed in claim 1 in which said thiol is ammonium thioglycollate.

4. A dye as claimed in claim 1 in which said quinone is 5-hydroxy-1,4-naphthoquinone.

5. A dye as claimed in claim 1 in which said quinone is 2-hydroxy-1,4-naphthoquinone.

References Cited in the file of this patent

UNITED STATES PATENTS

| | | |
|---|---|---|
| 2,610,941 | Schueller | Sept. 16, 1952 |
| 2,745,788 | Frohnsdorff et al. | May 15, 1956 |

OTHER REFERENCES

Dimroth et al.: Ann der Chem., volume 454, pages 124–30 (1940).

Fieser et al.: J.A.C.S., volume 69, pages 2335–8 (1947).

Fieser et al.: J.A.C.S., volume 71, pages 3609–14 (1949).

Moser et al.: J.A.C.S., volume 72, pages 5419–23 (1950).

Elsevier's "Encyclopedia of Organic Compounds," volume 12B, page 3030 (1952).

Lubs: Chemistry of Synthetic Dyes and Pigments, Reinhold Publ. Corp., New York (1955), pages 431–433.

Fieser et al.: "Organic Chemistry," 3rd edition, pages 139–40, 718–19 (1956).